Sept. 24, 1940.     H. G. BUSIGNIES     2,215,778
ANTENNA MOUNTING ARRANGEMENT
Filed Feb. 25, 1937
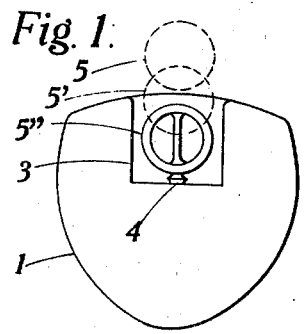
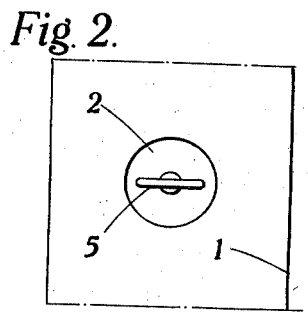
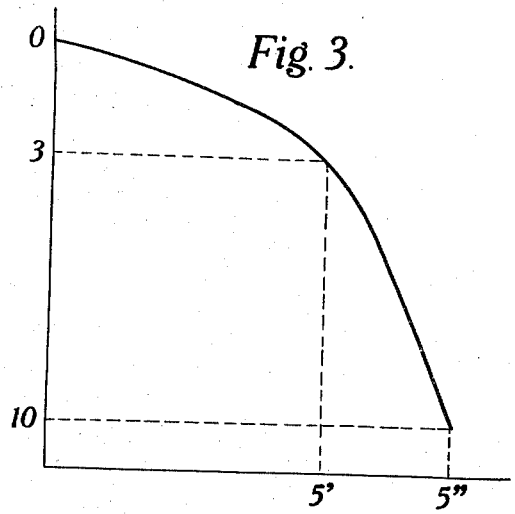
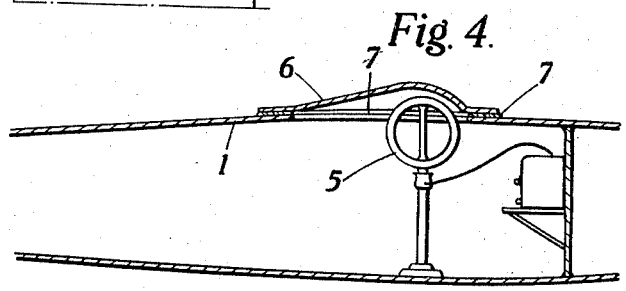
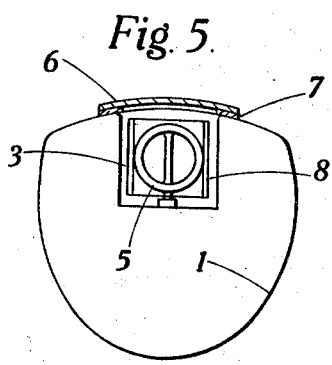
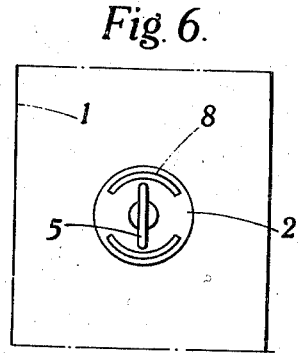
INVENTOR
HENRI GASTON BUSIGNIES
BY C. D. Phinney
ATTORNEY Patented Sept. 24, 1940

2,215,778

UNITED STATES PATENT OFFICE 2,215,778

ANTENNA MOUNTING ARRANGEMENT

Henri Gaston Busignies, Paris, France, assignor to International Standard Electric Corporation, New York, N. Y.

Application February 25, 1937, Serial No. 127,739
In France April 2, 1936

2 Claims. (Cl. 250—33)

This invention relates to improvements in receiving and transmitting aerials or like devices for electromagnetic waves and particularly to such devices of this kind employed with radio compasses or radiogoniometers, used, for example, on aeroplanes. The invention particularly applies to such devices employing the magnetic component of an electromagnetic field.

Although the invention is capable of other applications, it will be described hereafter in detail by way of example in its application to the reception of electromagnetic waves on aeroplanes for the purpose of radiogoniometry.

In radiogoniometers and radio compasses installed on aeroplanes it is usual at the present time to employ one or two small frames or loops which are of circular shape and are usually mounted outside the fuselage.

In the case of aeroplanes constructed mainly of wood and insulating materials it is possible to install the frame or frames inside the fuselage in order to avoid the loss of speed of the aeroplane due to the aerodynamic drag of projecting frames. It is then possible to arrange around the receiving frame, a device for compensating for the quadrantal error consisting, for example, of metal plates or bars suitably arranged around the rotating frame, or other devices known for this purpose. The use of these compensation devices around exterior frames must be avoided in order to prevent a considerable aero-dynamic drag.

On the other hand, in aeroplanes constructed largely of metal the installation of the receiving frame or frames within the fuselage has been impracticable because in a metal fuselage, the electromagnetic fields due to the transmitting stations are considerably reduced and are often practically non-existent.

It is the object of the present invention to provide a means for installing one or more receiving (or transmitting) frames inside a metal fuselage or other metal structure while permitting adequate reception (or transmission) and to provide for compensation of quadrantal error by the use of any one of the devices already mentioned.

The invention will be better understood from a reading of the following description in conjunction with the accompanying drawing in which:

Fig. 1 represents a cross-section of the fuselage of a metal aeroplane showing a receiving frame in various positions;

Fig. 2 is a plan of a portion of the same fuselage showing the frame;

Fig. 3 is a curve indicating the attenuation of the reception for different positions of the receiving frame;

Fig. 4 shows how it is possible to reduce the aero-dynamic drag of a frame installed in the position indicated at 5' in Fig. 1, by means of a cowling provided in accordance with the invention;

Fig. 5 shows the installation of a frame placed wholly inside the metallic fuselage with devices arranged around this frame for compensating for errors due for example to the presence of the metal masses of the aeroplane;

Finally, Fig. 6 shows in plan the frame and the compensation devices.

Referring to Figs. 1 and 2, the fuselage of a metal aeroplane is shown schematically at 1. The fuselage is formed with an opening 2 of any suitable shape but preferably circular. This opening constitutes the base of a cylindrical wall 3 of metallic or non-metallic material provided with a base 4 of metal or other material. The receiving frame may be positioned with respect to the opening 1 in any one of the positions shown at 5, 5', 5''.

If the receiving frame 5 is caused to descend progressively into cylinder 3, all things being equal, it will be found that the strength of reception diminishes as the frame 5 descends. Fig. 3 shows a curve obtained by plotting as abcissae, the successive positions of the frame 5 and as ordinates the attenuation of the reception in decibels. In position 5 there is but little attenuation, and in position 5'' although the attenuation is greater distant stations can still be received very well. If the frame is placed in the intermediate position 5' in which a small part of the frame projects from the fuselage of the aeroplane it is then possible to provide a cowling which only projects slightly. If, however, such cowling is not desired, it is possible to place the frame in the position 5'' wholly inside the cylinder 3 as shown in Fig. 5, and to close the upper portion and the base of this cylinder by plates of insulating material. It is, however, possible to close the opening by a metal plate 6 provided that the latter be electrically insulated (as at 7) over the greater portion of its perimeter of contact with the metal fuselage 1.

In the case where a metal cowling is employed as shown at 6 in Fig. 4, the latter will be electrically insulated from the metal fuselage 1. The insulating material 7 between the cowling and the metal fuselage may moreover be reduced to the absolute minimum thickness necessary in order to obtain a sufficient insulation for the atmospheric or other conditions also encountered on aeroplanes. It is possible to reduce the thickness of this insulating material to about several tenths of a millimetre; it may be constituted simply by a layer of air. It is possible to use as insulation a sheet of mica several tenths of a millimetre thick or any other insulating body suited to the specific conditions of use intended.

With the arrangements either of Fig. 4, or of Fig. 5, the devices for compensating for the quadrantal error will be fixed on the cylinder and its base (as shown at 8 in Fig. 5) or in the case in which this cylinder is not employed on insulating supports of suitable shape.

The arrangements described have the further advantage, that the electric field is considerably attenuated with respect to the magnetic field, and the antenna effect of the receiving frame is to a very great extent suppressed, particularly when the frame is covered by an insulated metal plate as has just been described; it is then possible to obtain a perfect figure of 8 diagram of reception even although the frame be electrically unbalanced with respect to earth.

The invention has been described in detail in its application to an aeroplane. It is obviously readily applicable to an airship, such as a dirigible, and also to a submarine, in order in the latter case to prevent in a similar manner the hydrodynamic resistance which would be caused by an external frame.

From another point of view, the invention is also applicable to the protection of a frame against external action, such as effects of bombardment, either on surface boats or in forts or block-houses. In this case the upper covering for the frame could consist of a covering of insulating material, of as great a thickness as desired, such as a covering of glass, wood or even reinforced concrete (provided that the reinforcing bars do not form closed circuits) in order to protect the frame against the bursting of projectiles which might strike such covering.

Finally, it is apparent that the invention could also be equally well applied to transmitting devices as to receiving devices.

What is claimed is:

1. A frame aerial, an aeroplane fuselage composed mainly of metal, means for mounting said aerial wholly within the limiting surfaces of said fuselage adjacent an opening in a surface thereof, and a metal covering for said opening, electrically insulated from said fuselage.

2. A combination comprising a frame aerial mounted substantially within the normal limiting surfaces of a structure composed mainly of metal, the surface of said structure being provided with an opening substantially coextensive with a diameter of said frame aerial, said frame aerial being mounted with its axis substantially centrally with respect to said opening and a cowling insulated from said structure covering said opening.

HENRI GASTON BUSIGNIES.